(12) United States Patent
Camalig et al.

(10) Patent No.: US 8,804,273 B1
(45) Date of Patent: Aug. 12, 2014

(54) HEAD FLY HEIGHT TESTING AND COMPENSATION

(71) Applicant: Seagate Technology LLC, Cupertino, CA (US)

(72) Inventors: Clifford Jayson Bringas Camalig, Singapore (SG); ChengYi Guo, Singapore (SG); Gan Swee Chuan, Singapore (SG); KangHai Lim, Singapore (SG); Mui Chong Chai, Singapore (SG); Richard Martin, Longmont, CO (US); Quinn Haddock, Provo, UT (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/948,426

(22) Filed: Jul. 23, 2013

(51) Int. Cl.
*G11B 21/02* (2006.01)
*G11B 27/36* (2006.01)
*G11B 19/04* (2006.01)

(52) U.S. Cl.
USPC ................................ 360/75; 360/31; 360/60

(58) Field of Classification Search
None
See application file for complete search history.

(56) References Cited

U.S. PATENT DOCUMENTS

| 7,609,473 | B1 | 10/2009 | Mate |
| 8,068,306 | B2 | 11/2011 | Ramamoorthy |
| 2006/0092550 | A1* | 5/2006 | Ishii et al. ......................... 360/75 |
| 2007/0268610 | A1* | 11/2007 | Luo ................................. 360/75 |

* cited by examiner

*Primary Examiner* — Andrew L Sniezek
(74) *Attorney, Agent, or Firm* — Mueting, Raasch & Gebhardt, P.A.

(57) ABSTRACT

Testing and compensating for fly height of a head in a storage device during settling time using a head for use on a storage medium and a processor to idle the head for an idle time, unload the head from idle, and compensate for any unsettled fly height of the head using the idle time and at least a pre-determined clearance settling function over time from idle.

20 Claims, 7 Drawing Sheets

HEAD FLY HEIGHT TESTING AND COMPENSATION

The disclosure herein relates to testing and compensating for fly height of a head in a storage device.

SUMMARY

One exemplary device (e.g., a data device for use in two-dimensional magnetic recording systems, shingled magnetic recording systems, bit-patterned media systems, heat-assisted magnetic recording systems, thermally assisted magnetic recording systems, energy assisted magnetic recording, etc.) may include a storage medium and a processor operably coupled to the storage medium.

One exemplary device may include a head configured to write and read data on a storage medium and a processor operably coupled to the head. The processor may be configured to idle the head for an idle time, unload the head from idle, and compensate for any unsettled fly height of the head using the idle time and at least a pre-determined clearance settling function over time from idle.

One exemplary method may include idling a head configured to write and read data on a storage medium for an idle time, unloading the head from idle, and compensating for any unsettled fly height of the head using at least the idle time and a pre-determined clearance settling function over time from idle.

One exemplary testing system may include computing apparatus configured to be coupled to one or more storage devices. Each storage device may include a storage medium and a head configured to write and read data from the storage medium. The computing apparatus may be configured to write a selected pattern to the storage medium using the head of at least one storage device, idle the head for a selected time period, read the selected pattern from the storage medium at least twice after the selected time period has lapsed for a settling time period to provide bit error rate data over the settling time period, and calculate the clearance settling function based on the bit error data, wherein the clearance settling function is configured to compensate for any unsettled fly height of the head of the storage device after idle.

One exemplary method may include providing a storage device comprising a storage medium and a head configured to write and read data from the storage medium, writing a selected pattern to the storage medium using the head, idling the head for a selected time period, reading the selected pattern from the storage medium at least twice after the selected time period has lapsed for a settling time period to provide bit error rate data over the settling time period, and calculating the clearance settling function based on the bit error data, wherein the clearance settling function is configured to compensate for any unsettled fly height of the head of the storage device after idle.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

When a head of a storage device is idle (e.g., parked on a ramp, resting on a landing zone of a medium, etc.) for a period of time, a clearance settling effect may be created. For example, once the head is unloaded, or comes off of the ramp, the fly height of the head of above the storage medium (e.g., often measured in angstroms such as 0 to about 10 angstroms) may be unsettled (e.g., the head may be too high or too low above the storage medium). The unsettled fly height may be such that the bit error rate of the head may be higher than when the head is settled (e.g., settled into a desired fly height above the storage medium). The time between the idle (e.g., from when the head unloads from ramp) when the head is settled may be referred to as "settling time." During this settling time, the bit error rate margins may be reduced, and if the head is already weak or the tuning is already stressed, the head may fail to properly write to the medium (e.g., weak writing failures). Additionally, this phenomenon may be problematic for storage devices (e.g., hard disk drives) that frequently undergo power cycle operations, emergency head loads/unloads, power saving loads/unloads, etc.

Figure 1:
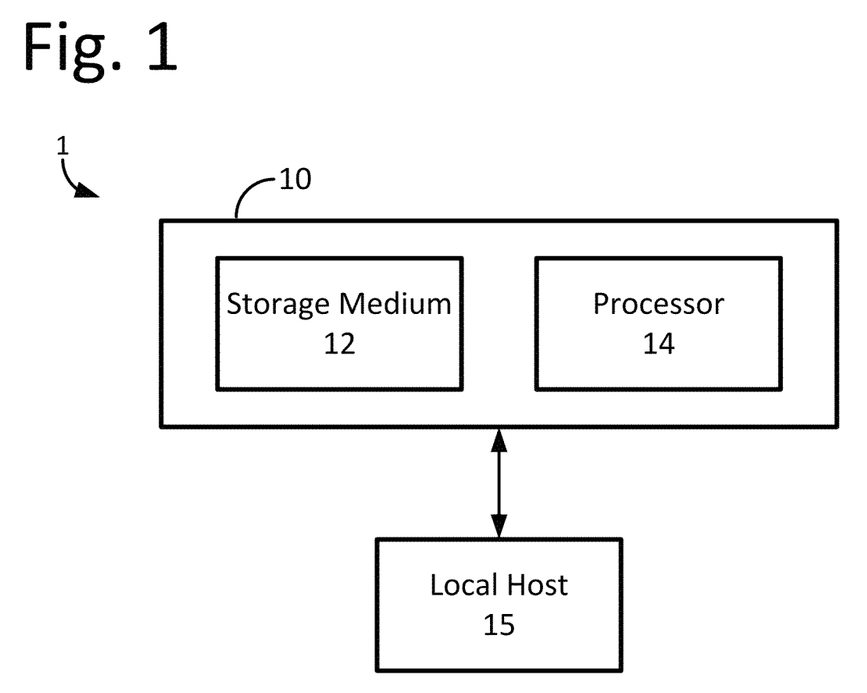
FIG. 1 is block diagram including an exemplary system for use in testing and compensating for the fly height of a head in a storage device.

An exemplary device 10 (e.g., data device) that can be used in the embodiments described herein is depicted in FIG. 1. The exemplary device 10 may be operably coupled to a local host 15 (e.g., a testing system, a personal computer system, a laptop, a server system, a cloud storage controller, etc.), e.g., for transferring data therebetween, as shown in FIG. 1. For example, the local host 15 may request data from or send data to the device 10 and the device 10 may provide such requested data to the local host 15 or may write such sent data to the device 10. In at least one embodiment, the local host 15 is a computer (such as, e.g., a personal computer, server, etc.). The device 10 includes a storage medium 12, and a processor, or processing apparatus, 14 that are operably coupled (e.g., electrically coupled to transmit data therebetween) to each other. The methods, devices, and systems disclosed herein may be generally described in the context of exemplary device 10 and/or exemplary system 1 including exemplary device 10, but that should in no way be taken as limiting the scope of the present disclosure. Generally, a device 10 may be any device and/or apparatus in which data may be written to the storage medium 12 and then read back from the storage medium 12, and a system 1 may include any device 10, local host 15, and/or any other apparatus needed to execute the exemplary methods and/or processes described herein. The storage medium 12 can include, but is not necessarily limited to, hard magnetic discs, magnetic tapes, optical discs, integrated circuits, volatile memory, nonvolatile memory, etc.

The processor 14 and/or local host 15 may include various circuitry, logic, memory, etc. for use in compensating for any unsettled fly height of the head(s) of the storage medium 12, determining, or calculating, a clearance settling function for any unsettled fly height of the head(s) of the storage medium 12, reading and writing data from the storage medium 12, etc. For example, the processor 14 and/or local host 15 may include one or more circuit components such as integrated circuits, processors, etc. that may be configured to interface with the storage medium 12 to control the fly height of the heads of a storage device using, e.g., a heater, or heater apparatus. Further, the processor 14 may include a harmonic sensor controller configured to measure amplitude change over time and covert the amplitude change to fly height, or spacing, change over time (e.g., using the Wallace Equation).

Figure 2:
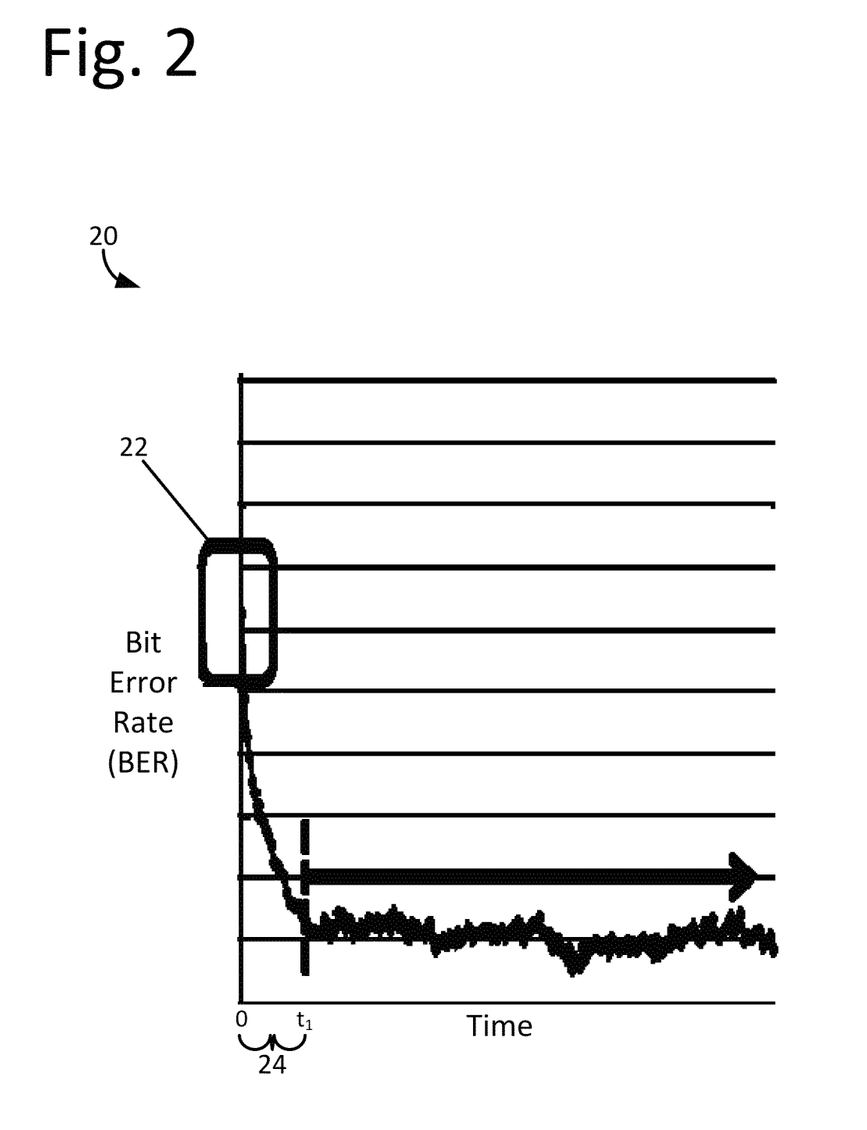
FIG. 2 is a graph of bit error rate of a storage device over time from idle.

As described herein, when a head of a storage device, such as, e.g., device 10, is idle (e.g., at the ramp) for a period of time (in some embodiments, a relatively long period of time), a clearance settling effect may be created. The clearance settling effect may be measured in bit error rate (BER). A graph 20 of bit error rate of a storage device over time from idle (e.g., unloaded from ramp) is depicted in FIG. 2. As shown, the bit rate error appears to settle, or even out, at $t_1$. The time period between 0, which represents idle, and $t_1$ may be referred to as the settling time period 24. After the settling time period 24 elapses, $t_1$, the head appears to have settled as indicated by the relatively flat-lined bit error rate. As identified in box 22, the bit error rate may be the highest immediately following idle (e.g., the unloading from ramp).

To compensate for the clearance settling effect, and therefore, for the high bit error rate, in the settling time period 24, the unsettled fly height, or spacing, change, between the head and the storage media in the storage medium may be measured, or calculated, during a testing period (e.g., before a storage device is shipped, before a storage device is used, etc.). Based on the unsettled fly height change for the device, the device may be programmed to compensate for the unsettled fly height change and/or the device may be rejected for use.

Figure 3:
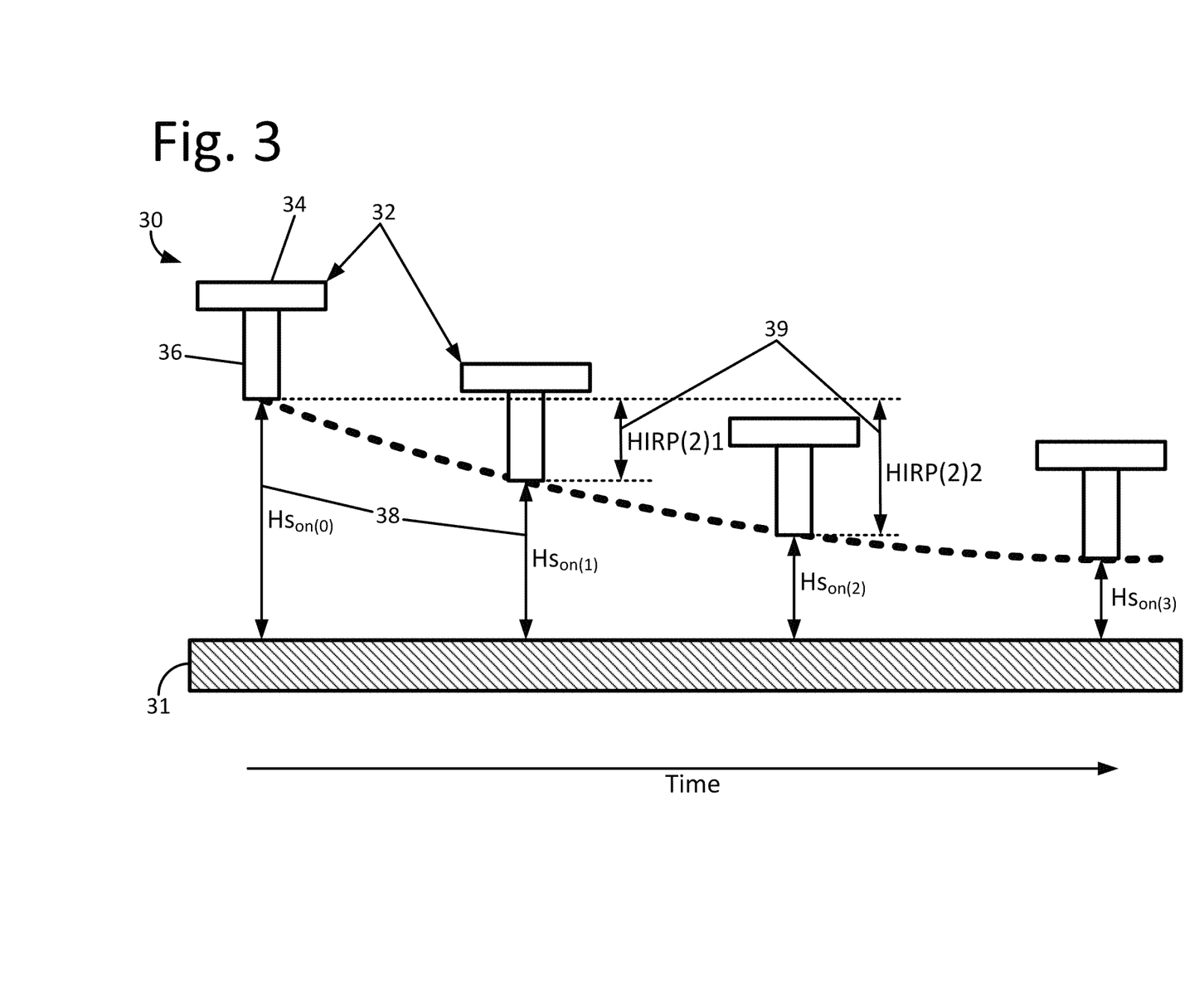
FIG. 3 is a conceptual diagram depicting the fly height of an exemplary head reading data from a storage medium over time from idle.

A conceptual diagram 30 depicting fly height 38 of an exemplary head 32 reading data from storage media 31 over time from idle is shown in FIG. 3. The diagrammatic head 32 includes a slider 34 and a protrusion 36 (e.g., used to write and/or read signals from the media 31). The fly height, $Hs_{on(n)}$, 38 extends between the protrusion 36 and the storage media 31. As shown, the fly height 38 decreases over time as the head 32 settles.

The fly height change, HIRP(2)n, 39 from the clearance settling effect may be measured using a harmonic sensor controller (e.g., a portion or part of the processor apparatus 14) and the $3^{rd}$ harmonic amplitude change over time from idle (e.g., off ramp) may be determined. A Wallace equation may be used to convert the amplitude change into a fly height change 39 as follows in Equation (1):

$$HIRP(2)n = (\lambda/2\pi)\ln(Hs_{on(n)}/Hs_{on(0)}) FH \text{ spacing change} \quad (1)$$

The first $3^{rd}$ harmonic amplitude measurement may be used as the reference in the Wallace equation as $Hs_{on(n)}$, to calculate the fly height, or spacing, change 39 over time. Such fly height change over time may be used to provide a clearance settling function used to compensate for any unsettled fly height of a head. A clearance settling function may be defined as a function of time that may be used to calculate a compensation value for unsettled fly height over time from idle (e.g., time from unloading from ramp). The clearance settling function may be described as varying (e.g., decrementing linearly, exponentially, etc.) over time from idle.

Figure 4:
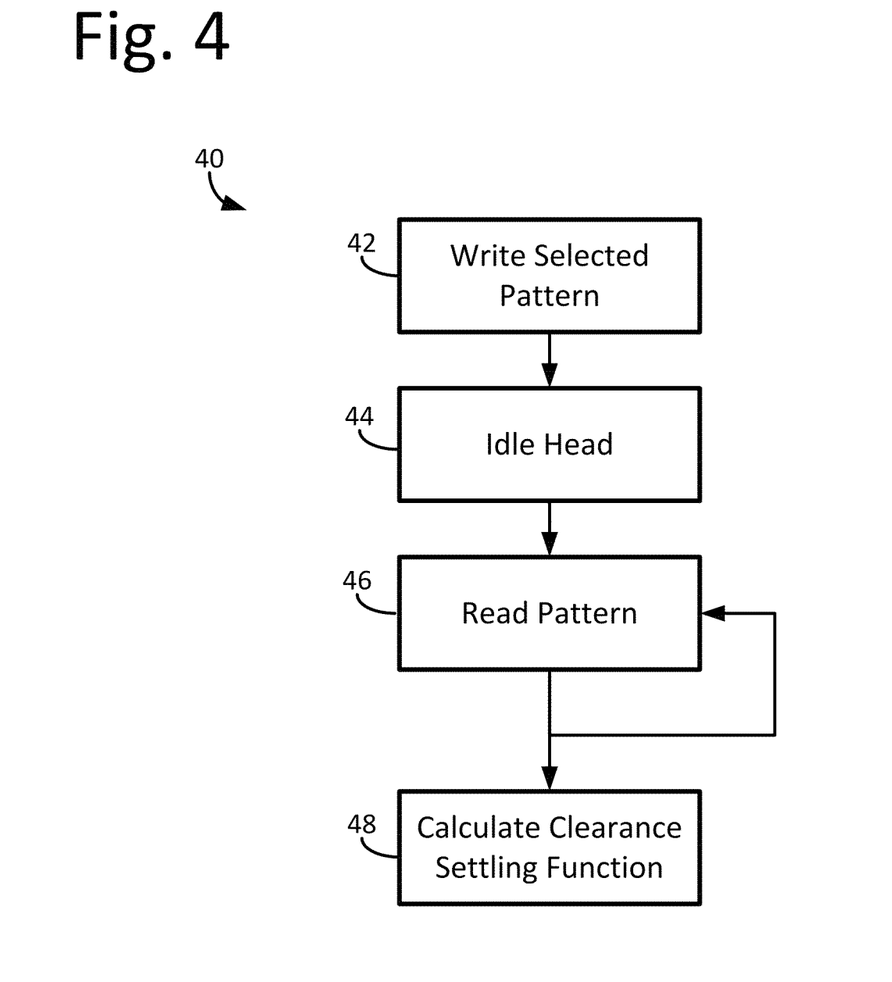
FIG. 4 is a flow diagram of exemplary method of determining a clearance settling function for a storage device.

A method 40 of determining a clearance settling function for a storage device is depicted in FIG. 4. The method 40 may first write a selected pattern 42 to the storage medium (e.g., one head may write to single platter, multiple heads may write to multiple platters, etc.). The selected pattern 42 may be a pre-selected signal or data pattern selected to test bit error rate of a storage medium. For example, a specific 2T frequency pattern may be written to the storage medium (e.g., 2T=2/F, where F is the tuned channel frequency by zone, 2T pattern is a fixed single tone bit pattern that will be written on the disc to, e.g., provide a flat amplitude pattern for the fly height change sensitivity measurements described herein).

The head may then be idled (e.g., loaded or parked to ramp) 44 and the motor may be spun-down for a selected time period of time to provide, or simulate, a maximum idle time such that, e.g., the head may have a maximum fly height, or spacing, when un-idled (e.g., unloaded from ramp). The selected idle time period may be between about 5 minutes and about 1 hour. For example, the selected idle time period may be greater than or equal to about 5 minutes, about 7 minutes, about 10 minutes, about 15 minutes, about 20 minutes, about 25 minutes, about 30 minutes, about 35 minutes, about 40 minutes, etc. and/or less than or equal to about 1 hour, about 45 minutes, about 40 minutes, about 35 minutes, about 30 minutes, about 25 minutes, about 20 minutes, etc.

After the head has idled 44, the method 40 may unload the head, spin-up, and read the pattern 46 from the storage medium at least two times over a settling time period to provide bit error rate data over the settling time period. Each "read" may include multiple revolutions and senses of the pattern (e.g., about 20 senses, about 30 senses, about 40 senses, etc.), and each of the senses may be averaged to provide the "read pattern".

The settling time period may be defined as the time period from idle to when the head settles (i.e., the fly height of the head has settled). In one or more embodiments, the settling time period may be pre-selected such that the entire settling effect may be measured, and therefore provide bit error rate data for the entire settling time period. In one or more embodiments, the method 40 may continue reading the pattern until the head has settled (e.g., it may be determined that the head has settled based on the bit error rate, etc.). The settling time period may be between about 1 minute and about 1 hour. For example, the selected time period may be greater than or equal to about 1 minute, about 5 minutes, about 7 minutes, about 10 minutes, about 15 minutes, about 20 minutes, about 25 minutes, about 30 minutes, about 35 minutes, about 40 minutes, etc. and/or less than or equal to about 1 hour, about 45 minutes, about 40 minutes, about 35 minutes, about 30 minutes, about 25 minutes, about 20 minutes, etc. In at least one embodiment, the selected time period is 15 minutes.

Further, the pattern may be read 46 for a selected number of reads over the settling time period. The selected number of reads may be between about 25 reads to about 500 reads. For example, the selected number of reads may be greater than or equal to about 25 reads, about 40 reads, about 50 reads, about 60 reads, about 70 reads, about 80 reads, about 90 reads, about 100 reads, about 125 reads, about 150 reads, about 200 reads, about 250 reads, etc. and/or less than or equal to about 500 reads, about 400 reads, about 300 reads, about 250 reads, about 200 reads, about 175 reads, about 150 reads, about 125 reads, about 100 reads, about 90 reads, about 75 reads, about 50 reads, etc. In at least one embodiment, the selected number of reads is 90.

Further, between each read 46, the method 40 may be pause for a pause time period. The pause time period may be between about 1 second and about 25 seconds. For example, the pause time period may be greater than or equal to about 1 second, about 2 seconds, about 3 seconds, about 5 seconds, about 10 seconds, about 15 seconds, etc. and/or less than or equal to about 25 seconds, 20 seconds, 15 seconds, 10 seconds, 7 seconds, etc. In at least one embodiment, the pause time period is 5 seconds.

Additionally, the selected number of reads may be described based on a rate. The pattern may be read 46 between about 1 time per minute to about 100 times per minute. For example, the pattern may be read 46 greater than or equal to about 1 time per minute, about 2 times per minute, about 3 times per minute, about 5 times per minute, about 10 times per minute, about 15 times per minute, about 20 times per minute, about 30 times per minute, about 40 times per minute, about 50 times per minute, about 60 times per minute, etc. and/or less than or equal to about 100 times per minute, about 90 times per minute, about 80 times per minute, about 70 times per minute, about 60 times per minute, about 50 times per minute, about 40 times per minute, about 30 times per minute, about 25 times per minute, about 20 times per minute, about 15 times per minute, etc.

As described herein, the pattern may be read 46 from the storage medium over the settling time period to provide bit error rate data over the settling time period. For example, the pattern read in each iteration 46 may be compared to the known bit pattern written in step 42 to provide a bit error rate at each particular point in time when the pattern is read 46 during the settling time period. The bit error rate data may then be used to calculate one or more values and/or a clearance settling function settings to compensate for any unsettled fly height of the head.

For instance, as shown in FIG. 4, after the selected time period, the selected number of reads, and/or after it has been determined that the head has settled, the method 40 may then use at least the bit error rate data to calculate a clearance settling function 48. The clearance settling function may be defined as a function configured to provide fly height compensation for a head over time from idle. In its simplest form, the clearance settling function may be a linear decaying function including a maximum fly height compensation value and a decay value. The maximum fly height compensation value may be the maximum fly height compensation to use for a particular head immediately after being un-idled (e.g., unloaded from ramp and used, etc.). The decay value may be a rate of decay off the maximum fly height compensation over time from idle. For example, the clearance settling function may be as follows: fly height compensation value=maximum fly height compensation value×(idle time/maximum idle time)×decay(time). In other forms, the clearance settling function may be a decaying polynomial, or exponential, function.

As described herein, the clearance settling function may be calculated using the Wallace Equation. More specifically, the bit error rate data immediately following idle (e.g., cold) may be compared to the bit error rate data when settled (e.g., hot), the clearance loss may be calculated using $HIRP(2)=(\lambda/2\pi)\ln(HSC1/HSC0)$ & $\lambda(2T$ wavelength$)=(radius\times2\pi\times rpm\times4)/(60\times f)$, GammaH may be solved using $GammaH=c1+c2(ntr/1\ k)+c3(ntr/1\ k)^2$, and HIRP(2) may be gammatized using $HIRP(2)=HIRP(2)\times GammaH$, wherein HSC0=3rd harmonic amplitude from ramp, HSC1=3rd harmonic amplitude read back for every read, and HIRP2=spacing changed calculated using Wallace Equation from HSC1 and HSC0 amplitude change.

Additionally, based on the bit error rate data collected and/or the clearance settling function calculated during the method 40, it may be determined whether the clearance settling function and/or other parameters may be used in the device. For example, measurements may be considered flawed if the standard deviation over all the iterations is not expected. Further, for example, a fly height compensation value may only be allowable within an expected range. If the fly height compensation or correction is above the range, the maximum allowable compensation/correction may be used whereas if the fly height compensation is below the minimum range, no correction may be needed. Also, the amount of decay in the clearance settling function may controlled by an upper and lower control limit.

The clearance settling function may be evaluated to determine whether the clearance settling function should be used in the device to compensate for any unsettled fly height of the head of the storage device after idle by comparing one or more values calculated when determining the clearance settling function to at least one threshold. For example, the standard deviation of fly height, or spacing, change (HIRP2) over the settling time period, the maximum fly height compensation value, and the decay value may be compared to threshold values to determine whether the calculated clearance settling function or parts thereof may be used.

For example, if the standard deviation of fly height change is greater than or equal to a maximum allowable fly height change variation (which, e.g., may indicate flawed data, errors, etc.), then the fly height compensation may be set to zero. If the standard deviation of fly height changes is less than a maximum allowable fly height change variation, then the maximum fly height compensation value may be evaluated determine whether it falls within upper and lower control limits.

For example, if the maximum fly height compensation value is less than an upper control limit and greater than a lower control limit, then the fly height compensation may be allowable or acceptable. If, however, the maximum fly height compensation value is greater than or equal to an upper control limit, then the fly height compensation may be set to the upper control limit, and if the maximum fly height compensation value is less than or equal to the lower control limit, then the fly height compensation may be set to zero.

As described, a decay value may also be compared to threshold values to determine whether the calculated clearance settling function or parts thereof may be used. For example, the decay value may be evaluated to determine whether it falls within upper and lower decay limits. If the decay value is less than an upper decay limit and greater than a lower decay limit, then the decay value may be allowable or acceptable. If, however, the decay value is greater than or equal to an upper decay limit, then the decay value may be set to the upper decay limit, and if the decay value is less than or equal to the lower decay limit, then the decay value may be set to the lower decay limit.

Figure 5:
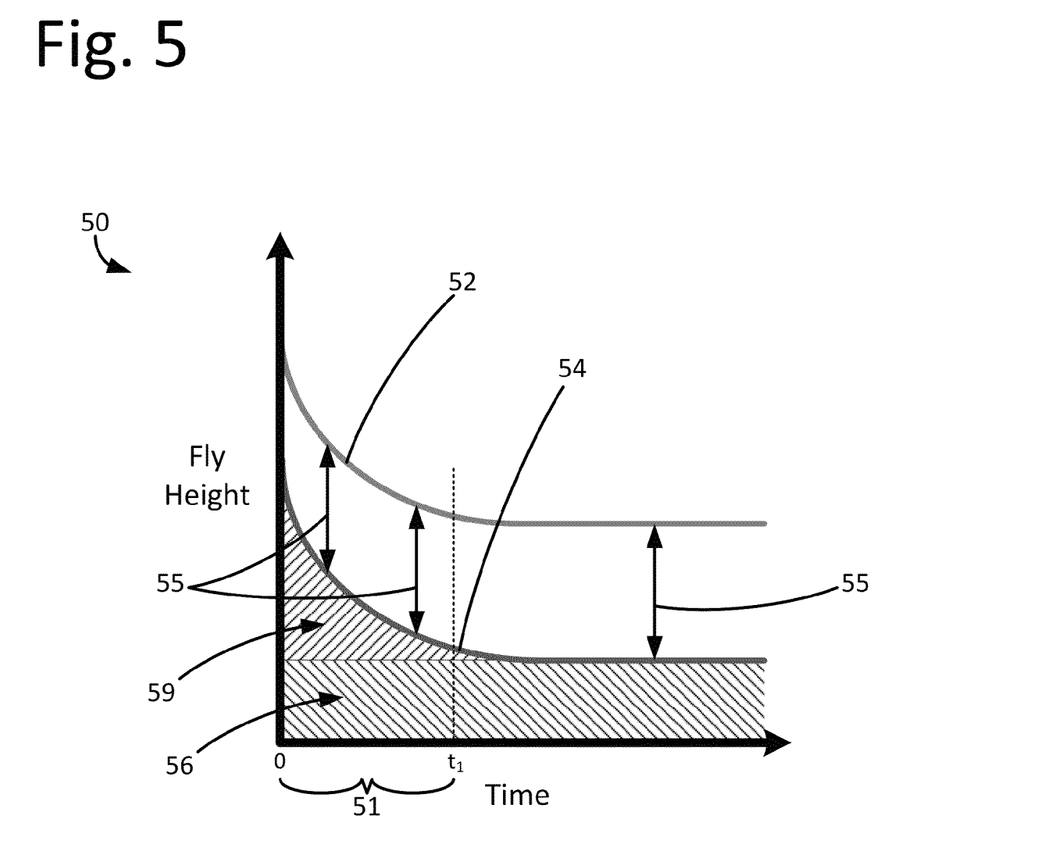
FIG. 5 is a graph depicting clearance compensation of a head of a storage device over time from idle.

Existing clearance compensation may be based on the sum of measured contact clearance (e.g., unchanging, known contact clearance) and temperature compensation (e.g., known fly height loss due to drive temperature changes). The graph 50 of FIG. 5 depicts passive, or uncompensated, fly height 52, active, or compensated, fly height 54, and target fly height 56 of a head. The passive fly height 52 is the fly height of the head before any clearance compensation. A heater apparatus (e.g., a heating element that when increases in temperature, expands thereby moving a head closer to the storage medium surface) may apply clearance compensation to move the head closer to the target fly height 56 to provide the active fly height

54. As shown, the existing clearance compensation 55, which is the difference between the passive fly height 52 and the active fly height 54, is constant, which provides a high bit error rate 59 during the settling time period 51 from 0, or idle, to $t_1$.

A clearance settling function, e.g., calculated using the method 40, may be used to estimate the fly height of the head based on time from idle, and then, the estimation of fly height of the head may be used to compensate for the fly height to, e.g., reduce the bit error rate during the settling time period. For example, a heater may be used to adjust the fly height of the head. During the settling time period, the heater may adjust the fly height of the head according to the clearance settling function.

Figure 6:
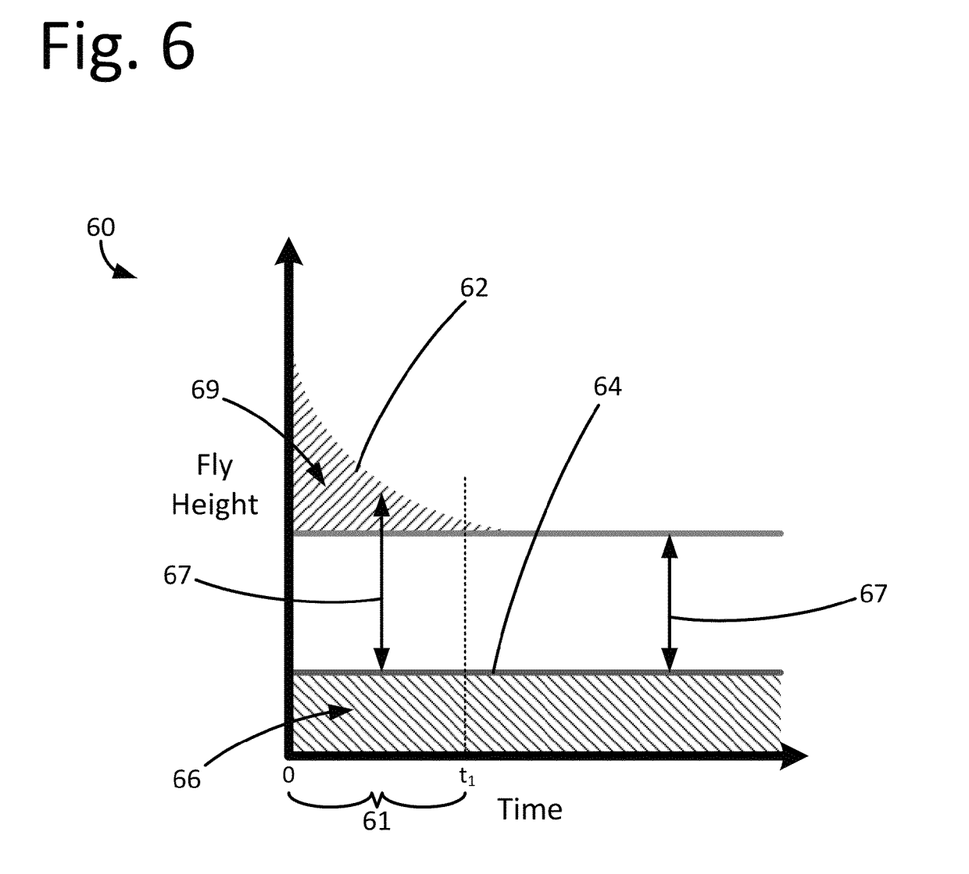
FIG. 6 is a graph depicting clearance compensation of a head of a storage device over time from idle using an exemplary clearance settling function.

The exemplary methods, devices, and/or systems described herein may provide a clearance calculation that is not only based on the sum of measured contact clearance compensation and temperature compensation but is also based on a clearance settling function that provides additional fly height compensation during the settling time. For example, a graph 60 of clearance compensation using an exemplary clearance settling function over time from idle is shown in FIG. 6. Similar to graph 50 of FIG. 5, the graph 60 depicts passive, or compensated, fly height 62, active, or compensated, fly height 64, and target fly height 66.

As shown in FIG. 6, the exemplary methods, devices, and/or systems described herein may add additional settling compensation 69 during the settling time period 61 such that the fly height compensation 67 moves the active fly height 64 closer to the target fly height during the settling time period 61 than the active fly height 54 depicted in FIG. 5 to provide a lower bit rate error during the settling time period 61. In other words, the exemplary methods, devices, and/or systems described herein provide fly height compensation 67 (including additional compensation 69) that accounts for any unsettled fly height from idle (e.g., from ramp) for the settling time period 61.

Additionally, the initial unsettled fly height of the head may be dependent upon the amount of time the head has been idle or loaded on the ramp, which may be referred to as the idle time. For example, the longer a head is idle (e.g., on ramp), the longer the head may take to settle. Thus, the exemplary methods, devices, and/or systems described herein may also compensate for how long the head has been idling (e.g., loaded on the ramp).

Figure 7:
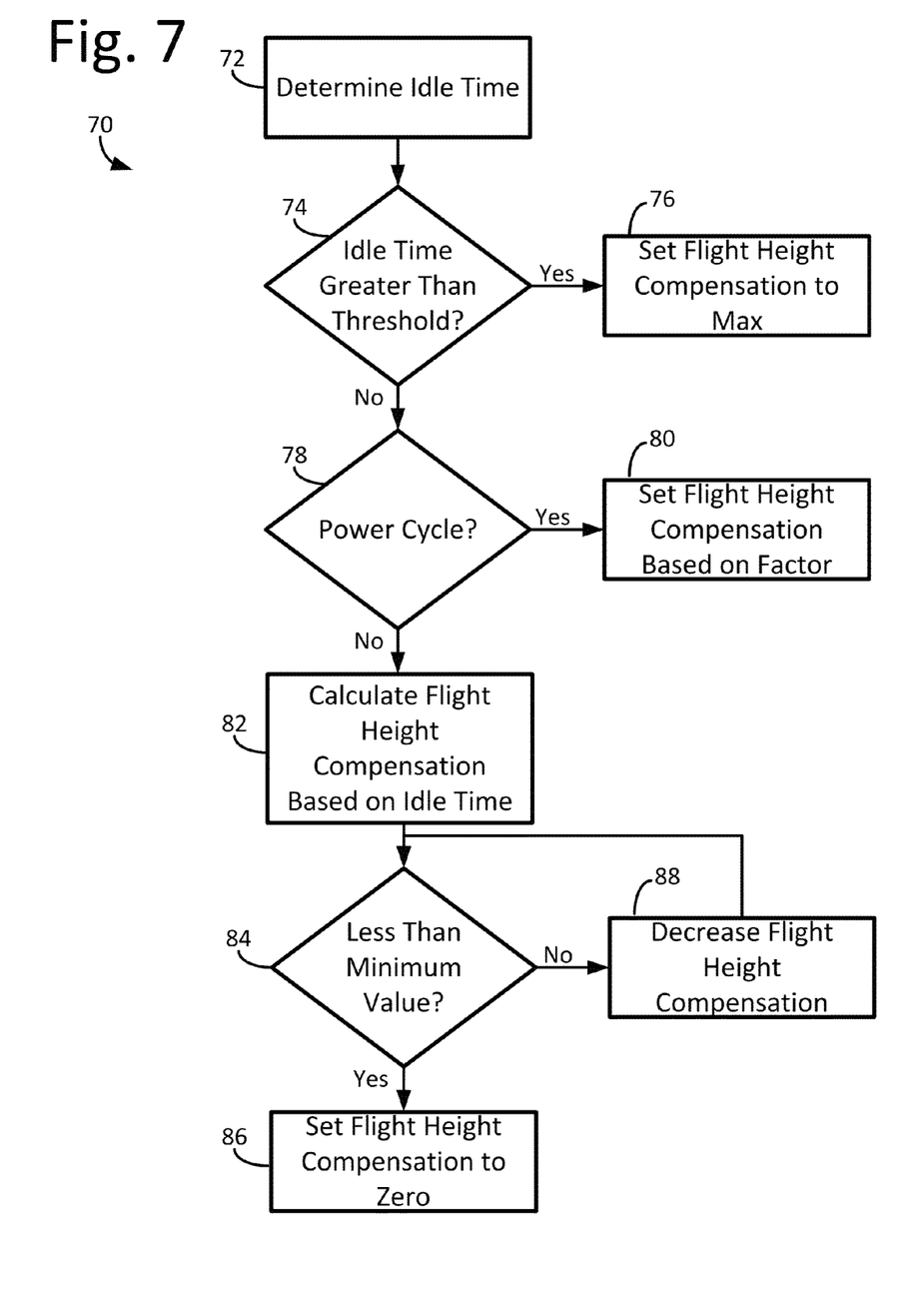
FIG. 7 is a flow diagram of an exemplary method of compensating for unsettled fly height of a head of a storage device.

An exemplary method 70 of compensating for unsettled fly height of a head of a storage device is depicted in FIG. 7. The method 70 may first determine how long the head has been idle 72. For example, when the head idles (e.g., loaded to ramp), the device and/or system may start a counter or a clock, and when data is requested from the device and/or system after idling such that head must un-idle (e.g., unload from ramp), the counter or clock may be used to provide an idle time, i.e., the amount of the time the head has been idling (e.g., loaded onto ramp).

A fly height compensation value may be based on how long the head has idled. For example, if the head has idled long enough to provide the maximum unsettled fly height, then the fly height compensation value may be set to the maximum value. More specifically, if the idle time is greater than or equal to a selected threshold 74, then the fly height compensation may be set to a maximum value 76. Since the idle time may be between about 1 minute and about 1 hour, the selected threshold may also be between 1 minutes and about 1 hour. For example, the selected threshold may be greater than or equal to about 1 minute, about 5 minutes, about 7 minutes, about 10 minutes, about 15 minutes, about 20 minutes, about 25 minutes, about 30 minutes, about 35 minutes, about 40 minutes, etc. and/or less than or equal to about 1 hour, about 45 minutes, about 40 minutes, about 35 minutes, about 30 minutes, about 25 minutes, about 20 minutes, etc. In at least one embodiment, the selected threshold is 30 minutes.

If the idle time is short, it may be possible that the device and/or system has been powered off previously. In this situation, the idle time may be unknown. If the idle time is less than the selected threshold 74 and the device has been power-cycled 78 (e.g., powered off and on again), then the fly height compensation value may be set to the maximum fly height compensation value multiplied by a power cycle factor 80. The power cycle factor 80 may be a value greater than or equal to 0 and less than 1 such at least some fly height compensation based on the clearance settling function may occur but not the maximum amount since it is unknown how long the head has idled while the device was powered off. The power cycle factor may be between about 0.35 and about 0.85. For example, the power cycle factor may be greater than or equal to about 0.35, about 0.4, about 0.45, about 0.5, about 0.65, about 0.7, etc. and/or less than or equal to about 0.8, about 0.75, about 0.7, about 0.65, about 0.6, about 0.5, etc. In at least one embodiment, the power cycle factor is 0.5.

If the idle time is less than the selected threshold 74 and the device has not been power-cycled 78 (e.g., powered off and on again), then the fly height compensation value may be calculated based on the idle time and the clearance settling function 82. For example, the idle time may be inputted into the clearance settling function to provide the fly height compensation value. When the clearance settling function is a decaying linear function, the fly height compensation value may be set to the maximum fly compensation value multiplied by the idle time divided by a maximum idle time. In other words, fly height compensation value may be set to an idle-time adjusted fly compensation value, e.g., the maximum fly height compensation value adjusted by a ratio of the idle time to the maximum idle time (e.g., the maximum idle time may be defined as the time it takes to provide maximum unsettled fly height after idle). A clearance settling function that is a decaying linear function may be described as including a maximum value decremented by a rate of decay as a function of time.

After the fly height compensation value has been set in one of processes 76, 80, 82, the fly height compensation value may be adjusted for the remainder of the settling time period until the fly height compensation value is less than or equal to a minimum fly height compensation value 84. If the fly height compensation value is less than or equal to a minimum fly height compensation value 84, then the method 40 may set the flight height compensation value to zero 86.

If the fly height compensation value is greater than a minimum fly height compensation value 84, then the method 40 may decrease the flight height compensation value 88. The fly height compensation value may be decreased 88 based on the time from idle using the clearance settling function and/or any other function based on the time from idle and/or the maximum fly height compensation value.

For example, the flight height compensation value may be set to the previous flight height compensation value multiplied by a decay value of a clearance settling function every time period (e.g., every minute) from idle. Further, for example, the fly height compensation value may be re-calculated using a clearance settling function every time period (e.g., every minute).

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

Exemplary methods and devices were described herein with reference to FIGS. 1-7. It will be apparent to one skilled in the art that elements or processes from one embodiment may be used in combination with elements or processes of the other embodiments, and that the possible embodiments of such methods and devices using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

What is claimed is:

1. A device comprising:
   a head configured to write and read data on a storage medium; and
   a processor operably coupled to the head and configured to:
   idle the head for an idle time,
   unload the head from idle, and
   compensate for any unsettled fly height of the head using the idle time and at least a pre-determined clearance settling function over time from idle.

2. The device of claim 1, wherein the processor is further configured to set a fly height compensation value to a maximum fly height compensation value multiplied by the idle time divided by a selected maximum idle time, the selected maximum idle time is an amount of idle time for the head to produce a maximum unsettled fly height, and the maximum fly height compensation value is a maximum fly height compensation for the head when the head has idled longer than or equal to the selected maximum idle time.

3. The device of claim 2, wherein the processor is further configured to set the fly height compensation value to zero if the maximum fly height compensation value multiplied by the idle time divided by the selected maximum idle time is less than a minimum fly height compensation value.

4. The device of claim 1, wherein the processor is further configured to set a fly height compensation value to a maximum fly height compensation value if the device has been power cycled.

5. The device of claim 1, wherein the pre-determined clearance settling function is a decaying linear function.

6. The device of claim 1, wherein the pre-determined clearance settling function is determined during testing by:
   writing a selected pattern to the storage medium using the head;
   idling the head for a selected time period;
   reading the selected pattern from the storage medium at least twice after the selected time period has lapsed to provide bit error rate data; and
   calculating the pre-determined clearance settling function based on the bit error data.

7. A method comprising:
   idling a head configured to write and read data on a storage medium for an idle time;
   unloading the head from idle; and
   compensating for any unsettled fly height of the head using at least the idle time and a pre-determined clearance settling function over time from idle.

8. The method of claim 7, wherein the compensating step comprises setting a fly height compensation value to a maximum fly height compensation value multiplied by the idle time divided by a selected maximum idle time, the selected maximum idle time being an amount of idle time for the head to produce a maximum unsettled fly height, and the maximum fly height compensation value being a maximum fly height compensation for the head when the head has idled longer than or equal to the selected maximum idle time.

9. The method of claim 7, wherein the compensating step further comprises setting a fly height compensation value to zero if a maximum fly height compensation value multiplied by the idle time divided by a selected maximum idle time is less than a minimum fly height compensation value.

10. The method of claim 7, wherein the compensating step comprises setting a fly height compensation value to a maximum fly height compensation value if the device has been power cycled.

11. The method of claim 7, wherein the pre-determined clearance settling function is a decaying linear function.

12. The method of claim 7, wherein the idle time comprises at least 30 minutes.

13. A testing system comprising:
   a computing apparatus configured to be coupled to one or more storage devices, each storage device comprising a storage medium and a head configured to write and read data from the storage medium, the computing apparatus configured to:
     write a selected pattern to the storage medium using the head of at least one storage device;
     idle the head for a selected time period;
     read the selected pattern from the storage medium at least twice after the selected time period has lapsed for a settling time period to provide bit error rate data over the settling time period; and
     calculate a decaying linear function based on the bit error data, the decaying linear function configured to compensate for any unsettled fly height of the head of the storage device after idle.

14. The system of claim 13, wherein the settling time period is greater than or equal to 5 minutes.

15. The system of claim 13, wherein the settling time period ends when the head has settled.

16. The system of claim 13, wherein the computing apparatus is further configured to evaluate the clearance settling function to determine whether the clearance settling function should be used in the device to compensate for any unsettled fly height of the head of the storage device after idle by comparing at least a portion of the clearance settling function to at least one threshold.

17. A method comprising:
   providing a storage device comprising a storage medium and a head configured to write and read data from the storage medium;
   writing a selected pattern to the storage medium using the head;
   idling the head for a selected time period;
   reading the selected pattern from the storage medium more than once after the selected time period has lapsed for a settling time period to provide bit error rate data over the settling time period; and
   calculating a clearance settling function based on the bit error data, the clearance settling function configured to compensate for any unsettled fly height of the head of the storage device after idle.

18. The method of claim 17, wherein the settling time period is greater than or equal to 5 minutes.

19. The method of claim 17, wherein the clearance settling function is a decaying linear function.

20. The method of claim 17, wherein the method further comprises evaluating the clearance settling function to determine whether the clearance settling function should be used in the device to compensate for any unsettled fly height of the head of the storage device after idle by comparing at least a portion of the clearance settling function to at least one threshold.

* * * * *